United States Patent [19]

Sato et al.

[11] Patent Number: 4,757,329

[45] Date of Patent: Jul. 12, 1988

[54] DESK-TOP THERMAL PRINTER

[75] Inventors: Yo Sato; Kazunosuke Makino, both of Tokyo; Tadao Kashiwaba, Iwate, all of Japan

[73] Assignee: Kabushiki Kaisha Sato, Japan

[21] Appl. No.: 828,068

[22] Filed: Feb. 10, 1986

[30] Foreign Application Priority Data

Feb. 13, 1985 [JP] Japan .................................. 60-24453

[51] Int. Cl.[4] ........................ G01D 15/10; B65C 9/18; B41J 3/20; G06K 19/00

[52] U.S. Cl. ................................ 346/76 PH; 346/136; 156/384; 156/577; 156/DIG. 47; 156/DIG. 49; 156/DIG. 51; 235/385; 235/432; 235/487; 235/488; 400/120; 400/73; 400/103; 400/707.1; 101/66; 101/93.04; 101/288

[58] Field of Search .......................... 346/76 PH, 136; 156/384, 570, 577, 579, 584, DIG. 47, 48, 49, 51; 235/383, 385, 378, 432, 472, 488, 487, 494; 400/120, 73, 103, 707.1; 101/93.04, 93.05, 288, 291, 292, 66

[56] References Cited

U.S. PATENT DOCUMENTS 4,407,692 10/1983 Torbeck .......................... 156/350 X
4,415,065 11/1983 Sandstedt .......................... 186/39 X
4,529,871 7/1985 Davidson ............................ 235/383

*Primary Examiner*—E. A. Goldberg
*Assistant Examiner*—Gerald E. Preston
*Attorney, Agent, or Firm*—Ostrolenk, Faber, Gerb & Soffen

[57] ABSTRACT

A desk-top and/or hand held thermal printer comprises a main unit having a guide path therein for a moving continuous label strip which includes a backing sheet and discrete labels detachably attached to the backing sheet. The printer has a flat bottom surface for resting on a flat surface; a retaining means for supporting a roll of backing sheet and labels and guiding the labels through a thermal printing device where a bar code or the like is thermally printed on the thermosensitive labels; a label peeling means for peeling the labels from the backing sheet; a label affixing means for affixing the peeled-off labels on objects; a data input means for example a keyboard or a computer input terminal; a data display means; and a controller for controlling the entire printer.

17 Claims, 4 Drawing Sheets

DESK-TOP THERMAL PRINTER

BACKGROUND OF THE INVENTION

This invention relates to a desk-top thermal printer and particularly to a desk-top thermal printer for printing labels and for peeling them from their backing sheet.

In recent years the use of thermal printers has become widespread and many different applications have been found for them. In one application the thermal printer is used for printing bar codes and characters on labels which labels are used in various ways for data processing and system administration. Up until now, however, there has not been available any such thermal printer for handy, individual use at any desired location. Moreover, conventional thermal printers of the type referred to have the disadvantage that the operator must peel each individual label from its backing sheet by hand.

SUMMARY OF THE INVENTION

It is an object of the present invention to provide a handy desk-top thermal printer for individual use which is freely portable and which can be easily placed on any available flat surface.

It is another object of the present invention to provide such desk-top thermal printer which is capable of peeling labels from their backing sheet and affixing them onto objects.

In accordance with the present invention there is provided a desk-top thermal printer comprising a main unit having a guide path through which a continuous label strip which includes thermosensitive labels detachably attached to a backing sheet pass. The main unit is supported on a flat bottom surface, permitting it to rest on any selected flat surface. The printer further includes a retaining means for supporting a roll of the label strip; a thermal label detecting means; a thermal label strip transfer means; a thermal printing means for thermally printing characters, marks or the like on the thermosensitive labels; a label peeling means; a label affixing means; a data input means for example a keyboard or computer input; a data display; and control means for controlling the overall operation of the printer.

The desk-top thermal printer according to the present invention is deliberately constructed to be small in size for individual use and to enable it to be easily carried from place to place. Label printing can be carried out while the printer is placed on any available flat surface or while being held steadily by hand. The peeling mechanism provides peeled printed labels which is quite useful in various modes of operation. The label printer is therefore usable as an output device which may be applied to a wide range of purposes in various fields of application.

DETAILED DESCRIPTION OF PREFERRED EMBODIMENTS

Figure 1:
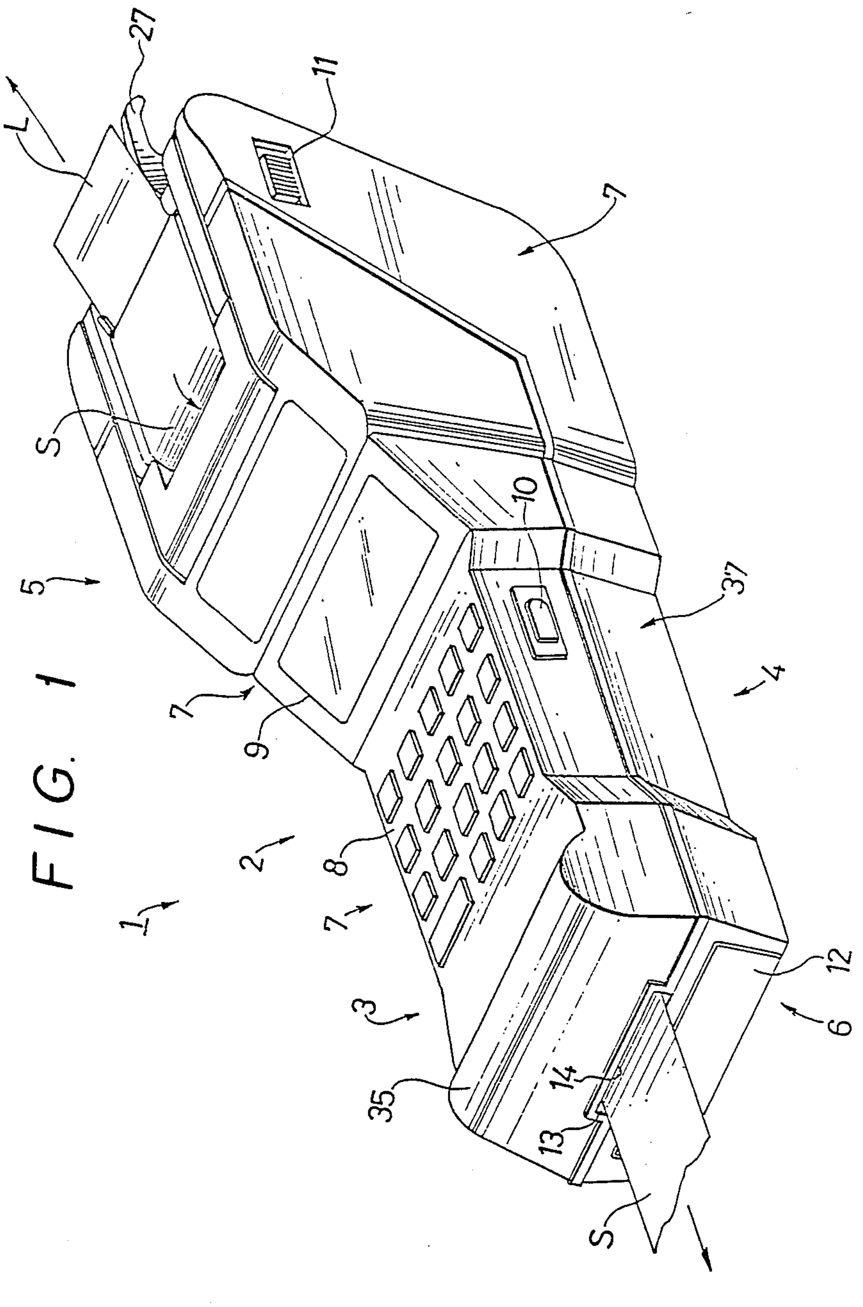
FIG. 1 is a perspective view of a first embodiment of the desk-top thermal printer according to the present invention.
Figure 2:
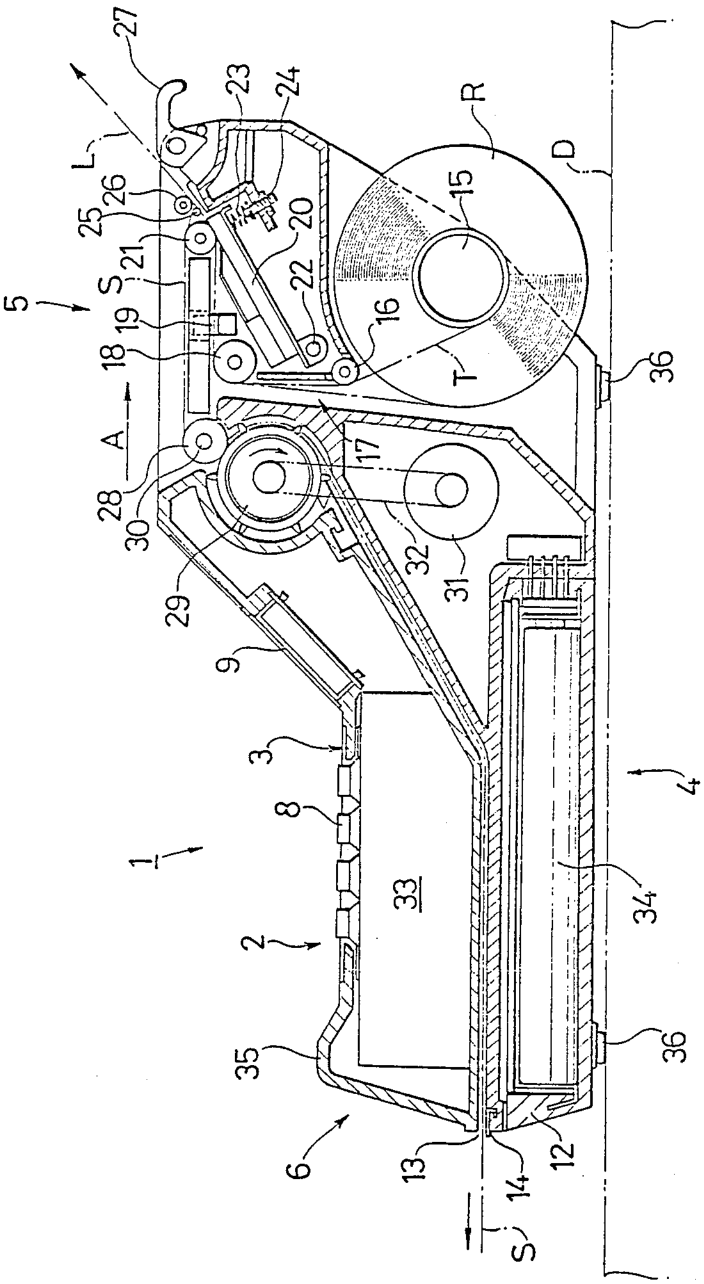
FIG. 2 is a sectional side view of the embodiment of FIG. 1.

Referring to FIGS. 1 and 2, the desk-top thermal printer 1 comprises a main unit 2 having a horizontal top surface 3, a bottom surface 4, an inclined top surface 5, a front surface 6 and left and right side surfaces 7. Horizontal top surface 3 is provided with a keyboard 8 having a number of keys for use as data input means, while a portion of inclined top surface 5 located adjacent horizontal top surface 3 contains a display 9 which serves as a data display means. A pair of start buttons 10 (one is shown) are provided, one on each of side surfaces 7, at positions below horizontal top surface 3 and an open/close button 11 is positioned on one side of side surfaces 7 at the upper portion thereof. Front surface 6 includes a cover 12 which encloses an internal housing in which a battery 34 is located. An outlet 13, defined in front surface 6, permits a backing sheet S to pass out of main unit 2. A cutter 14 is positioned at the upper edge of outlet 13.

Figure 3:
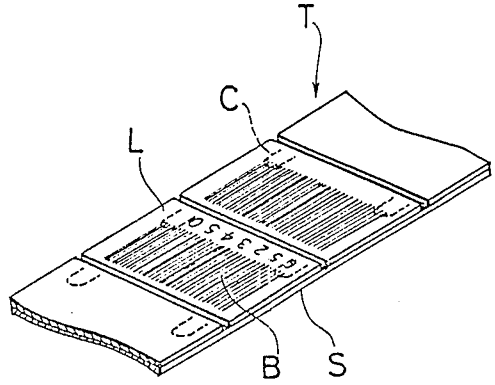
FIG. 3 is a perspective view of a segment of the label strip.

As can be seen from FIG. 2, which illustrates the internal structure of thermal printer 1, a retaining member 15 for retaining a roll R of label strip T is positioned below inclined top surface 5. Label strip T passes from roll R into a label strip guide path or passage 17, and is guided by guide roller 16. As shown in FIG. 3, label strip T consists of a backing sheet S on which are located a plurality of thermosensitive labels L. Each of the labels L has an adhesive back surface by which it is detachably adhered to label strip S. The labels follow one another along the length of the backing sheet.

Label strip T passes over a guide roller 18, then passes a label sensor 19 and thereafter is engaged between a thermal printing head 20 and a platen roller 21. At the thermal printing head 20 the label L is printed with characters, marks or the like which, depending on the data input from keyboard 8, may form a bar code B as shown in FIG. 3. Thermal printing head 20 is pivotably supported on pin 22 and it is so arranged that the pressure of the head can be adjusted by means of spring 23 and screw 24.

After printing of a label L is completed, the path of backing sheet S bends sharply at sheet bending pin 25. The sharp bending causes label L to be peeled from backing sheet S by a combination of this sharp bending action assisted by the action of an auxiliary peeling roller 26. The peeled label L is then fed out of main unit 2 and comes to rest on a label receiving cushion 27. Backing sheet S proceeds over guide roller 28 and is engaged by sheet driver roller 29 by which it is discharged outside of main unit 2 through outlet 13. The length of backing sheet S that has passed out of main unit 2 can be conveniently cut off by cutter 14.

When a new roll R of label strip T is to be loaded in main unit 2, button 11 is operated to allow a portion which includes platen roller 21 to swing upwardly about a pin 30, making it possible to insert a new roll R.

The sheet driver roller 29 is linked to a stepping motor 31 by timing belt 32 and is driven to rotate in steps in accordance with drive pulses produced by control circuit 33. Control circuit 33 is responsive to the operation of control buttons 10 and an output from label sensor 19.

Control circuit 33 is located inside main unit 2, at a position beneath keyboard 8. Control circuit 33 is electrically connected by means not illustrated in the figures to label sensor 19, thermal printing head 20, stepping motor 31, keyboard 8, display 9, start buttons 10 and battery 34 which is housed in a compartment located under control circuit 33.

The horizontal top surface 3 of main unit 2 is provided with a key guard 35, and bottom surface 4 includes two pairs of legs 36 (only one pair shown) for supporting thermal printer 1 on any available flat surface D. As shown in FIG. 1, side surfaces 7 are respectively provided with recessed portions 37 (only one shown) for making it easier to hold the thermal printer 1 in one hand while operating the keys of the keyboard 8 with the other. Further, as shown in FIG. 3, the backing sheet S of the label strip T is provided with cuts C for engagement by sheet driver roller 29.

The operation of the thermal printer illustrated in FIGS. 1 and 2 will now be explained. Printer 1 can be placed on any flat surface D during operation. It can be easily transported by hand from one location to another, enabling the printing of labels at any convenient place. As a first step, the keys of keyboard 8 are operated to input desired data. The data appears on display 9 and its accuracy can therefore be easily verified. Next, one of start buttons 10 is depressed causing stepping motor 31 to rotate sheet driver roller 29 to advance label strip T, by one label. At the same time thermal printing head 20 prints one of labels L with a bar code B or any other desired pattern or characters.

After the printing operation, backing sheet S which bears the printed label L is bent around sheet bending pin 25 causing label L to be peeled off backing sheet S and to be deposited onto label receiving cushion 27. Rather obviously, the label receiving cushion 27 has the appropriate surface for supporting the peeled label thereon. The operator can then remove the peeled-off label L from main unit 2 with his fingers and affix it on an object (not shown) for example, a merchandise item or a parcel to be delivered or the like. The printed label can be used for data administration. Alternatively, the object receiving the label may be drawn across the top of the thermal printer in the direction indicated by arrow A whereupon label L will be directly affixed thereupon.

Thermal printer 1 rather than being placed on the flat surface D can also be operated while being held by hand. In this case, the operator grasps the thermal printer at recessed portions 37 with, for example, his or her left hand and operates the keys of keyboard 8 with his or her right hand.

For stability on a flat surface, legs 36 located under the printer can have suctions cups or the like.

Figure 4:
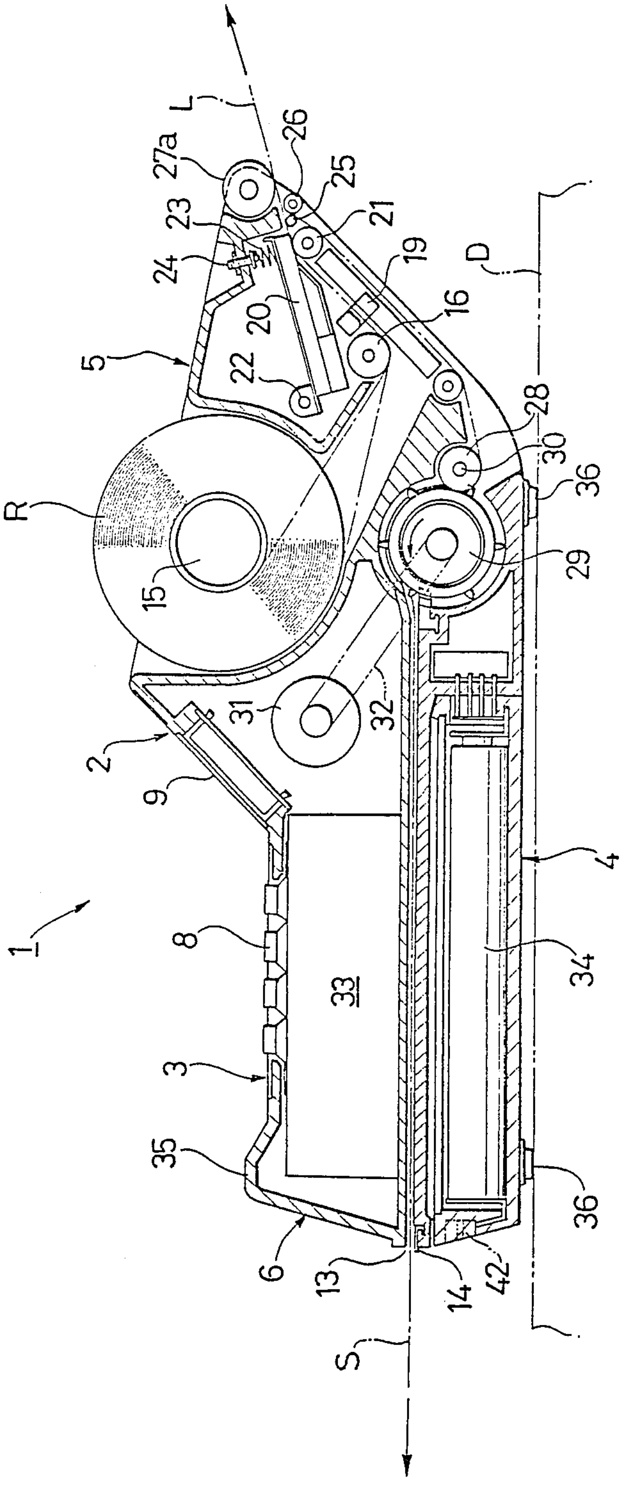
FIG. 4 is a sectional side view of a second embodiment of the desk-top thermal printer according to the present invention.

A second embodiment of the thermal printer according to the present invention is now explained with reference to FIG. 4. The second embodiment follows closely the first embodiment except for the reversal in the positional relationship between the thermal printing head and platen roller 21 which serves to protect thermal printing head 20 from adhering dust and the like. Also, label receiving cushion 27 of the first embodiment is replaced by label application roller *27a*. Like components of the first and second embodiments bear identical reference numerals and the previous description thereof will not be repeated.

In the second embodiment, unlike the first embodiment, the printed surface of label L faces upward and it so emerges from the printer whereby the operator can easily verify that the correct information was printed. The label strip path in the second embodiment differs of course from that of the first.

Figure 5:
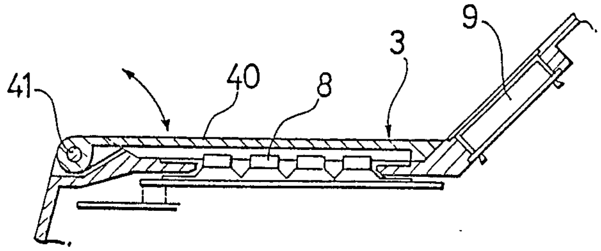
FIG. 5 is a sectional side view of a modified embodiment of the desk-top thermal printer according to the present invention.

In both embodiments it is possible, as shown in FIG. 5, to pivot a keyboard cover 40, pivotably supported on support pin 41, to swing between an open position allowing access to the keyboard and a closed position covering the keyboard and protecting it from harmful elements or contact.

Although both embodiments have been described to include a keyboard for data input, other arrangements are also possible. For example, as shown by a phantom line in FIG. 4, it is possible to provide an input terminal 42 which is connected to control circuit 33. Input terminal 42 will receive data directly from a master device or a central computer and direct it to control circuit 33, whereby thermal printer 1 can be a computer-controlled device. Alternatively, a reader, e.g., a pen reader, can be connected to input terminal 42 and data may be obtained by reading OCR characters, bar codes or the like and then input to control circuit 33. Moreover, control circuit 33 may comprise a ROM (read only memory) in which a control program and/or various data are stored. In this case, the control program and data can be easily changed by simple ROM replacement.

To facilitate holding or gripping of the thermal printer there may be further provided, at an appropriate portion of main unit 2, a detachable handle or grip. For example, a handle, of U-shaped cross section (not shown), may be provided on bottom surface 4 whereby main unit 2 can be easily held upside down and used as a portable label printer and affixing device. Or, a grip or handle can be provided which extends between the top surface 3 and front surface 6 and which need not be of U-shaped cross section and may have an easily manipulatable rod shape.

Although the present invention was described in connection with preferred embodiments thereof, many other variations, modifications and uses will now become apparent to those skilled in the art. It is therefore preferred that the present invention be limited not by the specific embodiments disclosed herein but only by the appended claims.

What is claimed is:

1. A desk-top thermal printer for printing labels, comprising:

a housing having outer dimensions which are small enough to enable the printer to be transported and operated by a single operator, the housing having a flat bottom surface for supporting the printer, during use thereof, on a selected flat surface, the printer being operable while being supported on the flat surface;

retaining means for supporting a roll of labels which includes an elongate continuous backing sheet and a plurality of discrete unprinted labels which are detachably attached to the backing sheet and which follow one another along the length of the backing sheet;

a thermal printer head for printing information on the labels and a defined guiding path in the housing for the backing sheet;

a label detector positioned ahead of the printer head for detecting each approaching label;

means for transporting the backing sheet through the printer head;

peeling means located past the printer head for separating each label from the backing sheet after the passage thereof through the printer head and depositing each printed label outside the housing;

label receiving and supporting means for holding each separated label in a manner which is effective to enable the separated label to be applied to an object to be marked by (a) drawing the object against the label supporting means, (b) holding the printer in hand and applying the separated label to the object with the printer or (c) removing the label by hand from the label supporting means and applying same to the object; and control means coupled to the print head, the label detector and to the transporting means for actuating, controlling and coordinating the operation of the printer head, label detector and transporting means.

2. A desk-top thermal printer according to claim 1 in which the transporting means comprises a driver roller which is engageable with the roll of labels for transportation thereof, a stepping motor and a timing belt which couples the stepping motor to the drive roller for effecting rotation of the drive roller.

3. A desk-top thermal printer according to claim 2 further comprising at least one start switch coupled to the control means, the control means including means for advancing the roll of labels by one label at a time in response to each activation of the start switch and an output from the label detector.

4. A desk-top thermal printer according to claim 1 which includes means for dispensing each label from the thermal printer with its printed face facing upward.

5. A desk-top thermal printer according to claim 1 in which the defined guiding path in the housing for the backing sheet changes its direction of travel sharply after passing the thermal printing head and in which the peeling means comprises a sheet bending pin located at the point of change in direction and further including an auxiliary peeling roller located adjacent the sheet bending pin which peeling roller is adapted to engage the labels that are peeled from the backing sheet and direct them in a direction different from the path traveled by the backing sheet.

6. A desk-top thermal printer according to claim 1 wherein the label receiving and supporting means comprises a label receiving cushion positioned to receive each peeled label from the printer.

7. A desk-top thermal printer according to claim 1 in which the label receiving and supporting means comprises a label affixing roller for receiving peeled labels from the interior of the housing and presenting them at a top rear location of the housing of the printer.

8. A desk-top thermal printer according to claim 1 which includes a data input means for inputting to the thermal printer information which is to be printed on the labels.

9. A desk-top thermal printer according to claim 8 in which the data input means comprises a keyboard.

10. A desk-top thermal printer according to claim 8 in which the data input means comprises a data input terminal for providing a connection to an external data supplying device.

11. A desk-top thermal printer according to claim 1 in which the control means comprises a read only memory, a control program stored in the read only memory and means for reading the control program from the read only memory and executing program instructions for control of the printer.

12. A desk-top thermal printer according to claim 11 in which the read only memory is interchangeable whereby alteration in the operation of the printer can be efficaciously obtained.

13. A desk-top thermal printer for printing labels, comprising:

a housing having outer dimensions which are small enough to render the printer transportable by a single operator and to be operable while being supported on a palm of an operator's hand;

retaining means for supporting a roll of labels which includes an elongate continuous backing sheet and a plurality of discrete unprinted labels detachably attached to the backing sheet and following one another along the length thereof;

a thermal printer head for printing information on the labels and a defined guiding path in the housing for the backing sheet;

a label detector positioned ahead of the printer head for detecting each approaching label;

means for transporting the backing sheet and the labels;

label receiving and supporting means for holding each separated label in a manner which is effective to enable the separated label to be applied to an object to be marked by (a) drawing the object against the label supporting means, (b) holding the printer in hand and applying the separated label to the object with the printer or (c) removing the label by hand from the label supporting means and applying same to the object;

peeling means located past the printer head for separating each label from the backing sheet after the passage thereof through the printer head and for depositing the printed label outside the housing;

data input means for inputting information to be printed on the labels to the printer;

data display means; and control means coupled to the print head, the label detector and to the transporting means for controlling the operation of the printer.

14. A desk-top thermal printer according to claim 13 in which the thermal printer head includes means for thermally printing a bar code on the labels.

15. The printer of claim 8, in which the housing includes recessed portions which are effective to enable the printer to be held in one hand while operating the data input means with the other hand.

16. A desk-top thermal printer according to claim 15, in which the data input means comprises a keyboard and wherein both the recessed portions and the keyboard are disposed at the same predetermined region of the housing.

17. A desk-top thermal printer according to claim 1, wherein the label receiving and supporting means includes a surface which is suitable for holding the peeled label thereon.

* * * * *